Figure 1:
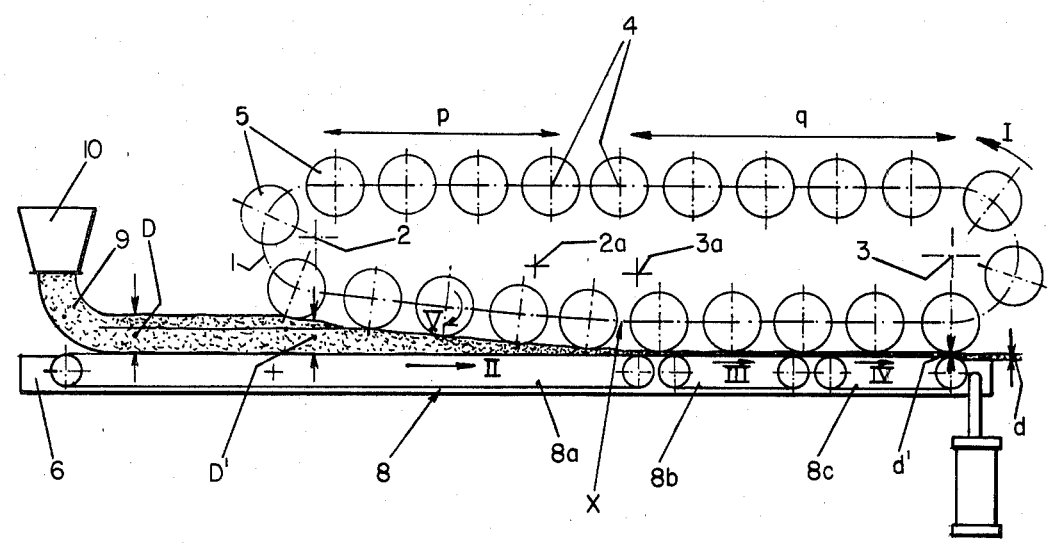

United States Patent [19]

Brinkers et al.

[11] 4,421,776

[45] Dec. 20, 1983

[54] METHOD AND DEVICE FOR ROLLING A DOUGH MASS INTO A CONTINUOUS SHEET

[75] Inventors: Bernardus H. C. Brinkers, Wassenaar; Willem B. A. N. Veenman, Rijnsaterwoude, both of Netherlands

[73] Assignee: Koninklijke Brinkers Margarinefabrieken B.V., Zoetermeer, Netherlands

[21] Appl. No.: 319,142

[22] Filed: Nov. 9, 1981

[30] Foreign Application Priority Data

Jan. 20, 1981 [NL] Netherlands .................. 8100256

[51] Int. Cl.³ .................. A21C 3/02; A21C 13/00
[52] U.S. Cl. .................. 426/502; 425/373
[58] Field of Search .................. 264/69, 70, 71; 425/370–372, 92, 373, 364, 335, 337, 364 R, 367, 363; 426/502, 503, 504, 517

[56] References Cited

U.S. PATENT DOCUMENTS

| | | | |
|---|---|---|---|
| 3,608,011 | 9/1971 | Jones | 264/70 |
| 3,709,650 | 1/1973 | Gutoski et al. | 425/373 |
| 3,973,895 | 8/1976 | Hayashi | 425/373 |
| 4,047,865 | 9/1977 | Axer et al. | 425/371 |
| 4,056,346 | 11/1977 | Hayashi | 425/373 |
| 4,113,412 | 9/1978 | Hayashi | 425/373 |
| 4,113,819 | 9/1978 | Hayashi et al. | 425/373 |
| 4,178,147 | 12/1979 | Hayashi | 425/372 |
| 4,192,636 | 3/1980 | Hayashi et al. | 425/373 |
| 4,266,920 | 5/1981 | Hayashi et al. | 425/335 |

*Primary Examiner*—Willard E. Hoag
*Attorney, Agent, or Firm*—C. O. Marshall, Jr.

[57] ABSTRACT

A method and device for rolling a dough mass, supplied in the shape of a thick layer, into a continuous sheet, whereby the dough mass resting on a moving supporting surface is subsequently contacted with a series of rotatable rolls which are situated increasingly closer to said supporting surface in the direction of movement of the supporting surface, the rolls simultaneously being moved with a linear velocity which is greater than the velocity of movement of the supporting surface. According to a first aspect of the invention the rolls are moved along such a path over the supporting surface that the angle between said path and the supporting surface decreases as seen in the direction of movement. According to a second aspect of the invention the contact between the dough slab and the rolls is intermittently interrupted during a short time duration, such that each portion of the dough mass supplied is completely released by the rolls a couple of times during the movement along the rolling stretch.

3 Claims, 3 Drawing Figures

METHOD AND DEVICE FOR ROLLING A DOUGH MASS INTO A CONTINUOUS SHEET

The invention relates to a method for rolling a dough mass, supplied in the shape of a thick layer, into a continuous sheet whereby the dough mass is contacted on a moving supporting surface with a series of rotatable rolling rolls which, as seen in the direction of movement of the supporting surface, are situated progressively closer to said supporting surface, the rolls being simultaneously moved along with a linear velocity which is greater than the velocity of movement of the supporting surface.

Such a device is known, the purpose being rolling a dough slab with an initial thickness of a couple of centimeters into a final thickness of a couple of millimeters.

In the known method the rolls in the rolling stretch are moved along such a path over the supporting surface that the generatrices of the rolls contacting the dough slab move in a common flat plane. Thereby the angle between the supporting surfaces and the path described by the rolls over it remains constant along the full length of the rolling stretch. As the dough slab thickness, as seen in the conveying direction, decreases, the further rolling will involve an increasing relative reduction in thickness per unit of rolling length. Particularly in the last portion of the rolling stretch the danger exists that the dough structure is inacceptably deteriorated by an excessive relative reduction in thickness per unit of rolling length. Especially the danger exists that the shear stresses caused in the dough by the contact with the rolls exceed a predetermined limit value whereby the cohesion in the dough sheet is broken. For this reason with the known method the angle between the supporting surface and the path of movement described by the roll assembly is kept relatively small. In order then to keep the length of the rolling stretch within practical limits a relatively small operative height of the rolls at the start of the rolling stretch is accepted in the known method. This means that the rolls arriving at the start of the rolling stretch from an inoperative position into an operative position, enter the supplied dough mass relatively abruptly and deeply. Then the danger exists that at the downstream side of the relative roll a ridge is formed by upsetting which propagates further along the rolling stretch.

The invention aims at removing or at least reducing the disadvantages of the known method.

According to a first aspect of the invention this aim is achieved in that the rolls are moved along such a path over the supporting surface that the angle between said path and the supporting surface decreases as seen in the direction of movement. This means that the supporting surface and the path of movement of the roll assembly include a relatively large (wedge) angle at the start of the rolling stretch whereby with a relatively short rolling stretch yet a relatively large operative height may be realized for the rolls at the start of the rolling stretch.

According to a second aspect of the invention the purpose in view is achieved in that the contact between the dough mass or dough slab and the rolls is intermittently interrupted during a short time interval namely such that each part of the dough slab supplied is completely released by the rolls a couple of times when moving along the rolling stretch.

It has appeared that by this method according to which the dough is given the opportunity to relax intermittently in the rolling stretch the chances of excessive stretching are substantially reduced. This means that as compared with the known method whereby the rolls continuously remain in contact with the moving dough slab all along the rolling stretch, the limit value of the shear stresses caused in the dough sheet is only reached with a substantially larger (wedge) angle in the last portion of the rolling stretch.

It has further appeared that with a given conveying velocity of the supporting surface the linear velocity of the rolls may be selected greater than in comparable circumstances without intermittent interruption of the contact between dough and rolls. This means that when selecting a maximum possible linear velocity of the rolls the production speed may be controlled within a broad area by simply varying the velocity of movement of the supporting surface. This last mentioned feature is of great importance in connection with the supply variations occurring in further treating the obtained dough sheet in devices which in praxis are placed in series with the assembly of supporting surface and rolls whereby the method according to the invention is performed.

The invention likewise relates to a device for performing the described method.

Starting from the known device which comprises a conveyor for the dough layer to be rolled and an assembly, positioned over that conveyor, of rolling rolls placed with their axes mutually parallel and transversely to the conveying direction of the dough, in an endless path, the facing runs of the conveyor and of the endless path delimiting a conveying gap, the height of which gradually decreases in the conveying direction, the device according to the invention is characterized according to the first aspect thereof in that the angle between the operative conveyor run and that of the roll assembly decreases as seen in the conveying direction.

Furthermore the device in the embodiment according to the second aspect of the invention is characterized in that the rolls on the one hand and the conveyor on the other hand are mounted in frame parts which are mutually movable in the sense of a larger and smaller gap height, a device being provided whereby said movement may be performed intermittently.

The invention is hereunder further illustrated with reference to the drawing of two examples of embodiments.

Figure 2:
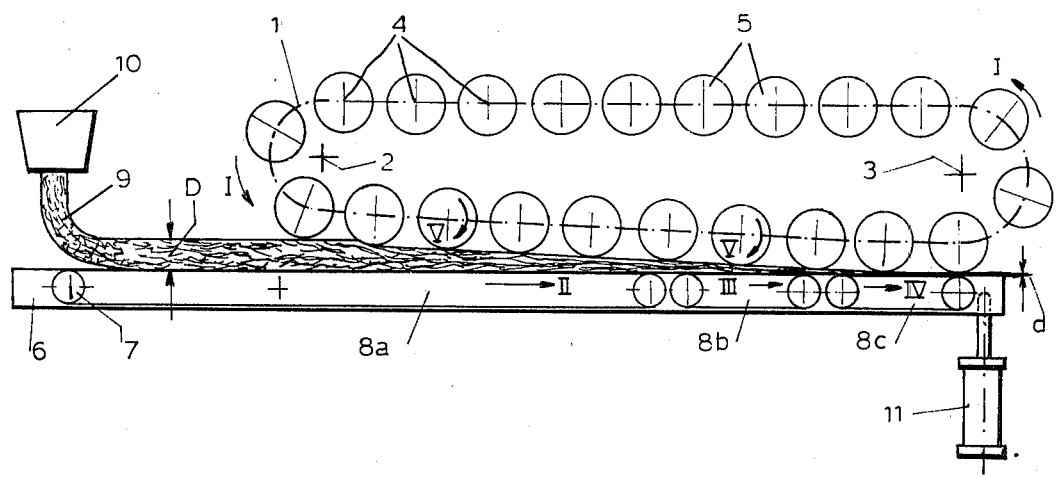
Figure 3:
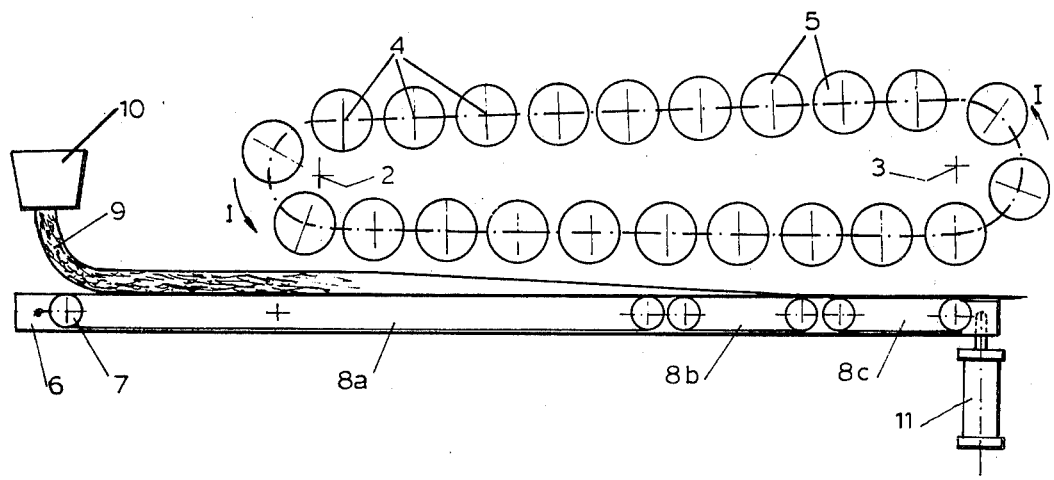

FIG. 1 shows a schematic longitudinal section through a device for rolling a dough mass accoring to a first aspect of the invention, FIG. 2 shows a schematic longitudinal section through a device for rolling a dough mass according to a second aspect of the invention, the conveyor being in the operative position relative to the rolls, and FIG. 3 shows a longitudinal section as illustrated in FIG. 2, however, here with the conveyor in the inoperative position relative to the rolls.

In FIG. 1 an endless chain indicated 1 is shown which is guided along two sprockets, the axes or shafts of which are indicated 2 and 3. One of said sprockets in driven by a power source not further shown in the drawing, namely such that the chain 1 thereby moves in the direction of arrow I. Parallel to the chain 1 a second similar chain has been provided. Said second chain which is not visible in the drawing is driven synchronously with the chain 1 and is guided along sprockets likewise mounted on the shafts 2 and 3. Both chains carry a series of parallel shafts 4 on which rolls 5 are mounted freely rotatable. The shafts 2 and 3 are journalled in a fixed part of the machine frame which is not further shown. The rolls 5 are thereby guided by the chains 1 along an endless path. In the lower (operative) run of said path the chains 1 are guided along two auxiliary sprockets, the axes or shafts thereof being indicated 2a and 3a. As a result thereof a bend has been formed at the position indicated x in the lower run of the endless path whereby said lower run is subdivided into a number of sections (p, q) having a different slant angle relative to the horizontal.

6 indicates a machine frame part in which the conveyor 8 is mounted which in a manner known per se is composed of a plurality, e.g. three, sections 8a, 8b and 8c arranged in series, said sections each comprising an endless conveyor belt guided along rollers.

The upper runs of the conveyor belts 8a–8c and the operative lower run of the roll assembly 5 delimit a conveying gap, the height of which gradually decreases to the right as seen in the drawing. In the first portion of the rolling stretch corresponding to the section p of the lower run of the roll assembly path said height decrease of the conveying gap takes place relatively quickly namely according to a relatively large (wedge) angle with respect to the operative upper run of the conveyor. In the last portion of the rolling stretch corresponding to the section q of the lower run of the roll assembly path said height decrease of the conveying gap takes place more slowly namely according to a relatively small (wedge) angle of the section q with respect to the operative conveyor surface.

In the conveying gap the dough slab 9 which is supplied by the extrusion device schematically indicated 10 and initially has a thickness D (in the order of e.g. 5 cm) is rolled into a final thickness d (in the order of e.g. 5 mm). At the entrance or supply side (at the position where the arcuate portion of the roll assembly merges with the first straightlined portion) the conveying gap has a height D' which is somewhat smaller than the initial thickness D of the dough slab to be rolled, the height d' of the conveying gap at the discharge side being somewhat smaller than the desired final thickness d of the dough. During the rolling action the rolls 5 rotate in the operative lower run around their axes in the direction of arrow V, the chains 1 and thereby the roll shafts 4 being moved in the conveying direction of the dough slab at a velocity which is larger than the conveying velocity (see arrow IV) of the conveyor belt 8c. The velocity of the conveyor belt 8c is again greater than that of the conveyor belt 8b in order to permit storing the length increase of the dough slab as a result of the rolling action. For the same reason the conveying velocity of the conveyor belt 8b is greater than that of the conveyor belt 8a (arrow II).

The absolute thickness reduction of the dough slab in the first portion of the rolling stretch (section p of the roll assembly) is substantially greater than that in the last portion of the rolling stretch (section q of the roll assembly). Nevertheless the relative thickness reduction per unit of length of the rolling stretch remains also in the first portion of the rolling stretch (section p of the roll assembly) relatively small so that also in this first portion of the rolling stretch one need not be afraid of undesirable effects on the dough structure.

The embodiment according to FIGS. 2 and 3 largely corresponds as to the general construction with that according to FIG. 1. Corresponding parts therefore have been indicated with the same reference numbers as in FIG. 1 and need not be described again.

In the embodiment according to FIGS. 2 and 3 the frame part 6 carrying the conveyor 8 is pivotally mounted around a shaft 7 which in the embodiment shown coincides with the left shaft of the conveyor section 8a.

11 indicates a piston-cylinder device, e.g. a pneumatic piston cylinder device, whereby the movable frame part 6 may be moved from the operative position according to FIG. 2 by pivoting it around the shaft 7 to the position according to FIG. 3 in which position the contact between the dough slab 9 and the rolls 5 in the lower run of the roll assembly has been interrupted. The piston cylinder device 11 is e.g. so adapted and connected in the control circuit that the movable frame part 6 is normally, e.g. in the position according to FIG. 2, pressed against a fixed abutment not further shown, under the influence of a spring operative in the stationary cylinder of the piston cylinder device, whereas intermittently air is supplied to the plunger side of the cylinder in order to bring the frame part 6 during a short interval into the "interrupted position" according to FIG. 3, during which interval the dough slab may relax in order to be better adapted to stand the stretching actions during the remainder of the rolling process as may be concluded from the experiences as found.

Moving the movable frame part 6 to the position according to FIG. 3 involves switching off the drive of the conveyor belts 8a–8c so that the rolling process is resumed in the same position of the dough slab as that in which the rolling process was temporarily interrupted.

Dependent on the type of the dough to be worked good results may be obtained if the contact between the dough slab and the rolls is completely interrupted during 5 to 20% of the total time. One may choose between a relatively large number of short interruptions and a relatively small number of interruptions of longer duration.

Starting from an average residence time of the dough in the rolling zone of e.g. one minute the contact between the dough slab and the rolls therefore has to be interrupted at least once per minute and preferably a couple of times per minute.

In many cases one will be enabled by varying the number of contact interruptions (and the conveying interruptions involved therewith) and/or the time duration of said interruptions to adapt the dough sheet production to the instant requirement of the dough sheet working apparatus. In such cases the dough rolling device will be in average be adjusted to a predetermined production speed such that with a maximum dough sheet requirement as may be expected yet a minimum number of interruptions will take place. The dough sheet produced may be guided towards the dough sheet working apparatus through a buffering loop which each time when detectors establish the exceeding of a predetermined length causes a contact interruption.

It will be clear that both aspects of the invention may be combined into a single embodient such as in fact has already been shown in FIG. 1 in which also the piston cylinder device has been represented.

We claim:

1. A method of rolling to compress a layer of dough into a continuous sheet, comprising the step of transporting the dough layer on a conveying surface while compressing the dough layer by means of a series of rotatable rolls which travel in the same direction but at a greater linear speed than said conveying surface, wherein the improvement comprises the step of intermittently relaxing the dough layer by eliminating the contact between said rolls and the dough layer, to release completely and then restore the pressure of said rolls against the dough layer at least once during the travel of said rolls along each portion of the dough layer.

2. A method according to claim 1, characterized in that the interruption of the contact between the dough and the rolls is obtained by moving the conveying surface relative to the rolls, while simultaneously the conveying movement of the conveying surface is interrupted.

3. In apparatus for rolling dough into a continuous sheet comprising a conveyor for transporting a dough layer, an assembly above the conveyor of traveling rolls having their axes arranged parallel to one another and transverse to the conveying direction, and means for guiding the traveling rolls in an endless path having a run which is spaced from the conveyor by a gap that decreases in the conveying direction, the improvement comprising a mounting for the conveyor which is displaceable relative to the roll assembly to increase said gap substantially so as to bring said rolls out of contact with said dough layer, said conveyor mounting comprising a flame which supports the conveyor and which is mounted on a pivot adjacent to the entrance end of the conveyor, and means connected to the frame at a point adjacent to the exit end of the conveyor for lowering the frame and the conveyor substantially below their normal positions.

* * * * *